Oct. 31, 1933.  J. H. YOUNG  1,933,000
FLUID MOTOR
Filed June 4, 1932   2 Sheets-Sheet 1
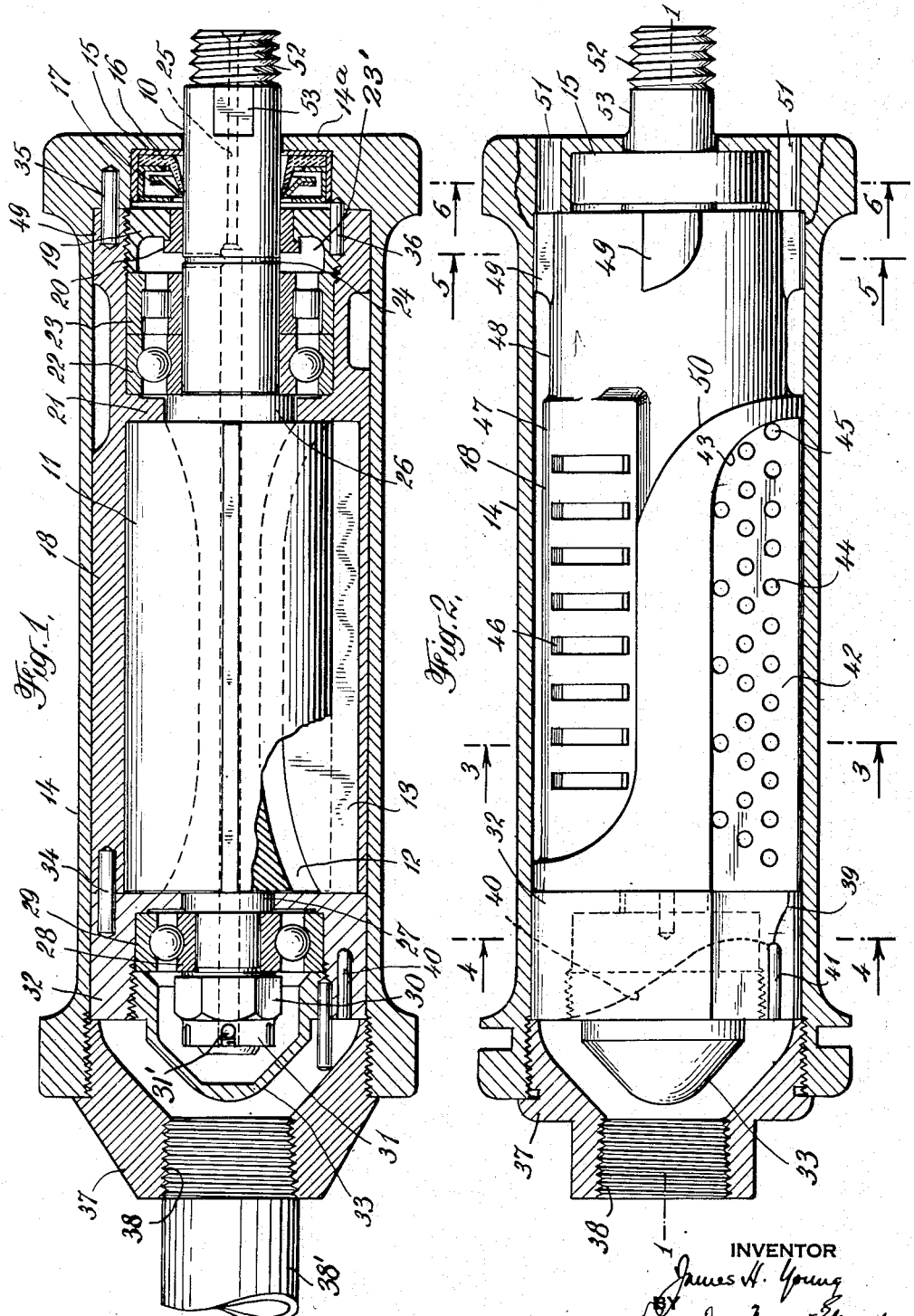
INVENTOR
James H. Young Oct. 31, 1933.    J. H. YOUNG    1,933,000
FLUID MOTOR
Filed June 4, 1932    2 Sheets-Sheet 2
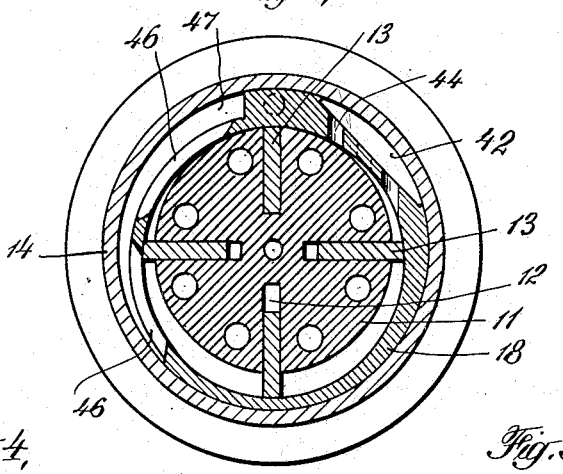
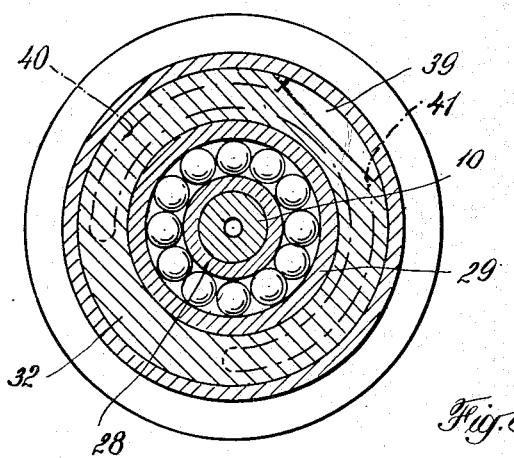
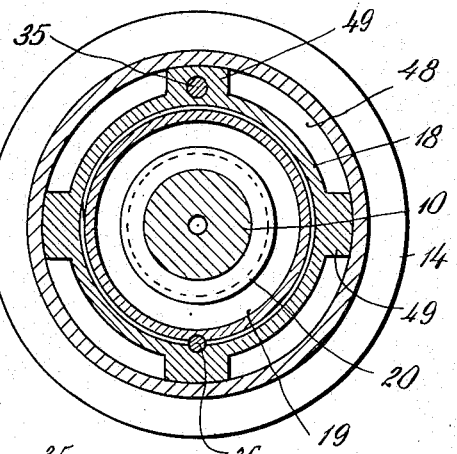
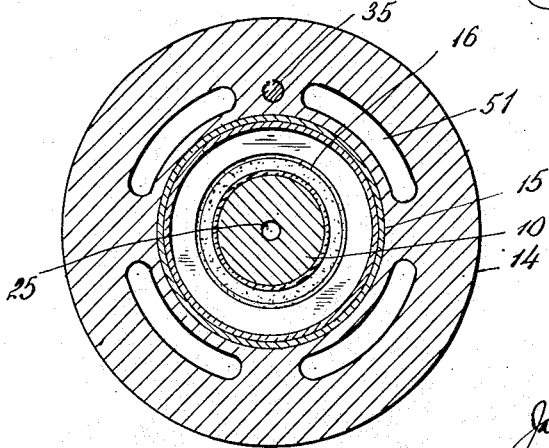
INVENTOR
James H. Young
BY
Pennie, Davis, Marvin Edmonds
ATTORNEYS Patented Oct. 31, 1933

1,933,000

UNITED STATES PATENT OFFICE 1,933,000

FLUID MOTOR

James Henry Young, New York, N. Y., assignor to Thomas C. Wilson, Incorporated, New York, N. Y., a corporation of New York Application June 4, 1932. Serial No. 615,286

18 Claims. (Cl. 121—34)

This invention relates to motors and is concerned more particularly with a new fluid-operated motor, which is more powerful and consumes less fluid than prior motors of the same general size, the higher efficiency resulting from the use in the motor of a number of novel features of construction. The motor of my invention is simple to manufacture, easy to assemble and take apart for inspection and repair, and is compact so that it may be used in restricted spaces, as for example, in boiler tubes where it is used for operating cleaning devices.

Air motors have been used for some time for driving tube cleaners and there are numerous motors for this purpose now on the market. The commercial motors, with which I am familiar, are, with the exception of the motor disclosed in my co-pending application, Serial No. 582,075, filed December 19, 1931, subject to numerous objections. For example, these motors consume large amounts of compressed air, they are very noisy, and their efficiency falls off rapidly during use. Also, most of these prior motors are expensive to manufacture and maintain, and they cannot be easily taken apart and re-assembled.

The motor of the present invention is not subject to these objections and its performance, as shown by comparative tests, is superior to prior motors. In the new motor, there are only a few working parts and the rotating elements are supported in "frictionless" bearings continually supplied with lubricant. These bearings withstand both radial and thrust loads so that the rotor moves freely and easily and loss of efficiency through friction resulting from rubbing together of parts as a result of wear in the bearings is indefinitely deferred. The air supplied to the motor flows from the inlet to the discharge through passages which are constructed to permit stream line flow with a minimum of abrupt changes in direction and these passages are further constructed so as to permit the air to expand within the motor. Since dismantling and assembling of the motor are simple operations, inspection, repair, and replacement of the parts may be carried on in the field with little delay and the motor can thus be operated without substantial interruption for long periods.

For a better understanding of the invention, reference may be had to the accompanying drawings, in which Fig. 1 is a longitudinal section through the new motor;

Fig. 2 is a similar view but with certain of the parts shown in side elevation, and Figs. 3, 4, 5 and 6 are sectional views on the lines 3—3, 4—4, 5—5 and 6—6 of Fig. 1.

With reference to the drawings, the motor illustrated comprises a rotor shaft or spindle 10 having an enlarged cylindrical portion or rotor 11 provided with radial slots 12 in which are mounted vanes 13 of any suitable material, such as steel of proper composition. The rotor lies within a main casing 14 which has a partition 14ª at one end in the form of a flange defining an opening through which the spindle projects. Surrounding the opening in the end of the casing is a lubricant retainer 15 of standard construction, this retainer including a leather washer 16, the inner edge of which is held in contact with the spindle by means of a spring 17.

Disposed within the casing and contacting with the partition at the end thereof is a cylinder 18, the cylinder having a central chamber, the axis of which is offset from the axis of the spindle and rotor. The cylinder has open ends and at one end is provided a closure in the form of a ring 19 threaded into the cylinder, the ring carrying a bearing sleeve 20 of bronze or other bearing material through which the spindle 10 passes. One or more frictionless bearings are mounted within the end of the cylinder 18 in the small chamber defined by the ring 19 and a partition 21 formed as an integral flange on the cylinder wall. In the construction disclosed, there are two bearings 22 and 23 in the small chamber, the bearing 22 being a ball bearing of the radial and thrust type and the bearing 23 a roller bearing. These bearings lie in contact and the outer raceway of the ball bearing bears against one surface of the flange 21 while the outer raceway of the roller bearing rests against the end of the ring 19, which serves as an abutment therefor. Between the end of the roller bearing and the ring 19 is a space 23' for lubricant which may be supplied through a port 24 extending through the spindle 10 and connecting with a longitudinal port 25 through the spindle.

The spindle 10 is provided with an integral collar 26 which normally lies in alignment with the flange 21 and the inner raceway of the roller bearing 22 bears against this collar. Beyond the collar the spindle is of enlarged diameter to provide the rotor 11 and beyond the rotor the spindle has a collar 27 which abuts the inner raceway 28 of a radial and thrust bearing generally designated 29. A nut 30 is mounted on the spindle beyond the bearing 29, this nut being castellated as indicated at 31, for the reception of a lock pin 31'.

The open end of the cylinder 18 is closed by a cup-shaped closure member 32 in which the bearing 29 is mounted and the end of the cup-shaped member is closed by a cap 33 so that the bearing 29 is within a small closed dust proof chamber. The bore 25 extending longitudinally through the spindle provides means for introducing grease or other lubricant into this closed chamber so that the bearing 29 will be continually supplied with lubricant. The cup-shaped member is connected to the cylinder 18 against relative rotation by means of one or more pins 34 which enter aligned recesses in the member and the cylinder, and the cylinder is similarly connected to the casing by one or more pins 35 received in recesses in the cylinder and the end wall of the casing. Rotation of the ring 19 within the end of the casing is prevented by means of a pin 36 which fits in a slot formed partly in the ring and partly in the inner wall of the cylinder, the pin being held in place by the end wall of casing 14. One end of the pin also engages the lubricant retainer 15 and keeps it seated against the end of the casing.

The rear end of the casing 14 is closed by a cap 37 having a threaded opening 38 into which an air pipe 38′ may be screwed, and air entering the cap, flows through a passage 39 formed in the outer surface of the cup 32. A channel 40 is cut in the face of the cup member, the channel opening into the passage 39 through a slot 41. This channel provides for air flow around the cup member to the passage from the side of the cup member opposite to that in which the passage is formed.

The outer surface of the cylinder 18 is cut away in alignment with the passage 39 to form a longitudinally extending inlet chamber 42 defined by the cylinder and the casing 14. One longitudinal side wall of the chamber curves toward the other side wall as indicated at 43 and ports 44 are formed through the casing from the bottom of the chamber 42. These ports are inclined to radii of the cylinder and air entering the motor through the cap flows into the chamber 42 and then through the ports into the interior of the cylinder. Air which flows to a part of the interior of the cap remote from the passage 39 may flow through the channel 40 and its outlet 41 into the passage 39, thus avoiding a pocket within the cap in which the air is stagnant. Also, the air flowing into the chamber 42 is directed by the curved wall 43 so that a proper supply of air to the ports remote from the passage 39, such as port 45, is maintained.

The cylinder is so constructed that at the top, as illustrated in Fig. 3, the vanes 13 are forced fully into the slots by their contact with the interior of the cylinder. Air entering the cylinder through the inlet ports 44 bears against the vanes which begin to issue from the slots in the region of the ports and the air causes rapid rotation of the rotor. The air flows in the space between the outer surface of the rotor and the inner surface of the cylinder throughout approximately 180° where the cylinder wall is provided with a plurality of exhaust ports 46 which are of slot form and extend circumferentially. In the construction illustrated there are two rows of exhaust ports and these ports open into an exhaust chamber defined between the casing and cylinder, the chamber having a portion extending lengthwise of the cylinder and another portion extending circumferentially thereof. The lengthwise portion 47 of the exhaust chamber is relatively shallow and as the air issues from the exhaust ports, it flows lengthwise in the exhaust chamber and enters the deeper circumferential portion 48 thereof. At the ends of the chamber are baffles 49 which extend to the inner wall of the casing and the rib 50 which separates one side of the exhaust chamber from the inlet chamber has a curved wall as shown.

The air entering the portion 47 of the exhaust chamber has a tendency to continue moving circumferentially but turns gradually and flows lengthwise of the cylinder into the circumferential portion of the exhaust chamber, the change of direction being assisted by the curved wall of rib 50. The rib and the baffles together cooperate to produce a substantially uniform distribution of air throughout the exhaust chamber and thus reduce back pressure.

In the flange 14a at the end of the casing are formed arcuate discharge ports 51 and air escapes from the circumferential portion of the exhaust chamber to the atmosphere through the discharge ports. By forming the exhaust chamber in the manner described, the air may expand as it flows through it and the chamber walls are shaped so as to permit escape of the air uniformly through the discharge ports without abrupt changes of direction.

The end of the spindle 10 is provided with a screw thread 52 on which a tube cleaner or other device to be operated may be mounted and flats 53 are cut in the exposed end of the spindle so that the spindle can be held against rotation during the removal of the device. Lubricant for the bearings is provided by introducing grease or other suitable lubricant through the bore 25 which opens at the end of the spindle, and when the device is in operation, the end of the bore is closed by the cleaning tool and the lubricant is thus prevented from escaping. Little lubricant is required for the vanes and for this purpose a small amount of oil is introduced into the air supplied to the device.

In the new motor, it will be seen that the spindle and rotor are mounted in frictionless bearings so that the rotor can be driven with a small amount of friction. These bearings are preferably of the combined radial and thrust type so that there is no endwise movement of the spindle and rotor and they are fully enclosed so that no air reaches them and little or no lubricant escapes. The rotor is kept out of contact with the end walls of the chamber in which it lies and friction arising from rubbing of the parts is substantially eliminated. In the course of long continued use, the bearings may wear so that end play causes the rotor to engage the cylinder walls. When the wear has proceeded to the point where the speed of the motor is impaired, the device may be taken apart and new bearings quickly introduced.

What I claim:

1. A fluid-operated motor which comprises the combination of a casing, a hollow cylinder within the casing having an internal partition subdividing the interior of the cylinder into a large chamber and a small chamber, a shaft extending through the cylinder and provided with a rotor within the large chamber carrying vanes contacting with the chamber wall, means for admitting fluid under pressure into the large chamber to drive the rotor, frictionless bearings for the shaft, one of said bearings being disposed beyond the end of said cylinder and the other within said small chamber, and means for enclosing both bearings.

2. A fluid-operated motor which comprises the combination of a casing, a hollow cylinder within the casing containing a partition sub-dividing the interior of the cylinder into a large chamber and a small chamber, a shaft extending through the cylinder and provided with a rotor within the large chamber carrying vanes contacting with the chamber wall, means for admitting fluid under pressure into the large chamber to drive the rotor, frictionless radial bearings for the shaft, one of said bearings being disposed outside said cylinder and the other within the small chamber, at least one of said bearings taking thrust, and means for enclosing said bearings.

3. A fluid-operated motor which comprises the combination of a casing, a hollow cylinder within said casing containing a partition sub-dividing the interior of the cylinder into a large chamber and a small chamber, a shaft extending through the cylinder and provided with a rotor within the large chamber carrying vanes contacting with the chamber wall, means for admitting fluid under pressure into the large chamber to drive the rotor, a bearing for the shaft within the small chamber and closure for the end of said small chamber, a hollow closure member for the end of said large chamber, a bearing for the shaft within said closure member, and a cap for said closure member enclosing the bearing within it.

4. A fluid-operated motor which comprises the combination of a casing, a hollow cylinder within said casing containing a partition sub-dividing the interior of the cylinder into a large chamber and a small chamber, a shaft extending through the cylinder and provided with a rotor within the large chamber carrying vanes contacting with the chamber wall, means for admitting fluid under pressure into the large chamber to drive the rotor, a closure for the end of the large chamber, a bearing for the shaft within said closure, a cap mounted in the closure and with the closure enclosing said bearing, a bearing for the shaft within the small chamber, a closure for the end of the cylinder at which the small chamber is located, and means for supplying lubricant to said bearings.

5. A fluid-operated motor which comprises a casing having a closed end provided with a passage, a cylinder within the casing seated against the closed end thereof, said cylinder having a chamber within it at one end adjacent said closed end of the casing, a shaft extending through the cylinder and through the passage in the casing, a frictionless bearing for the shaft within the chamber in the casing, a closure for the other end of the cylinder, a cap cooperating with the closure to define a chamber, a frictionless bearing in said chamber, a rotor on the shaft lying within the cylinder and carrying vanes contacting with the cylinder wall, and means for admitting air into the cylinder to engage said vanes and drive the rotor.

6. In a fluid-operated motor, a cylinder having an interior flange spaced inwardly from one end, a cup shaped member closing the other end of the cylinder, a shaft extending through the cylinder and having a rotor carrying vanes which contact with the inner wall of the cylinder, a frictionless bearing for the shaft with the cylinder between said flange and the adjacent end of the cylinder, a frictionless bearing for the shaft within said closure, a cap for said cup-shaped member, and means closing the first end of the cylinder.

7. In a fluid-operated motor, a cylinder having a large chamber and a small chamber within it separated by a partition, a hollow member closing the cylinder and one end of the large chamber, a shaft extending through said cylinder and terminating within said hollow member, a bearing for the shaft within said member, a cap for said member and with it forming a housing for said bearing, a bearing for the shaft within the small chamber, a closure for said small chamber, and means for supplying lubricant to said housing and small chamber for the bearings therein.

8. In a fluid-operated motor, a cylinder having a large chamber and a small chamber within it separated by a partition, a hollow member closing the cylinder and one end of the large chamber, a shaft extending through said cylinder and terminating within said hollow member, a frictionless bearing for the shaft within said member, a cap for said member and with it forming a housing for said bearing, a plurality of bearings for said shaft within said small chamber, at least one of said bearings being of the frictionless type, a closure for said small chamber, and means for supplying lubricant to said housing and small chamber for the bearings therein.

9. In a fluid-operated motor, a cylinder having a large chamber and a small chamber within it separated by a partition, a hollow member closing the cylinder and one end of the large chamber, a shaft extending through said cylinder and terminating within said hollow member, a bearing for the shaft within said member, a cap for said member and with it forming a housing for said bearing, a bearing for the shaft within the small chamber, a closure for said small chamber, and passages through said shaft through which lubricant may be introduced into said housing and small chamber for the bearings therein.

10. In a fluid-operated motor, a casing having an open end and an interior flange restricting the opening at the other end, a cylinder within the casing having a large chamber and a small chamber within it, said small chamber being disposed near said flange, a shaft extending through said cylinder and out the restricted end of said casing, said shaft having a rotor within said large chamber carrying vanes contacting with the chamber walls, a lubricant retainer within the casing adjacent said flange, said retainer encircling said shaft, a frictionless bearing in said small chamber, and means for supplying lubricant to said small chamber for the bearing therein.

11. A fluid-operated motor which comprises the combination of a casing containing a chamber, a shaft extending through the chamber and provided with a rotor within the chamber carrying vanes contacting with the chamber wall, means for admitting fluid under pressure into the chamber to drive the rotor, smaller enclosed chambers separate from the main chamber at the ends of the latter, said shaft terminating in one smaller chamber and projecting through the other and out of the casing, bearings for the shaft in each of said enclosed chambers, means for supplying lubricant to said enclosed chambers for the bearings therein, and a lubricant retainer mounted in 12. A fluid-operated motor which comprises the combination of a casing, a hollow cylinder within the casing having an interior partition sub-dividing the interior of the cylinder into a large chamber and a small chamber, a shaft extending through the cylinder and provided with a rotor within the large chamber carrying vanes contacting with the chamber wall, means for admitting fluid under pressure into the large chamber to drive the rotor, a closure for the end of the large chamber, a cap for the closure and with it defining a chamber into which said shaft projects, a bearing for said shaft within the chamber defined by the closure and cap, a pair of bearings for the shaft in said small chamber, a cap closing the end of said small chamber, and means for supplying lubricant to said bearings.

13. In a fluid operated motor, a casing, a cylinder within the casing, a shaft extending through the cylinder and out one end of the casing, said shaft having a rotor within the cylinder carrying vanes contacting with the inner wall of the cylinder, a closure for one end of the cylinder, a partition sub-dividing the cylinder and with said closure defining a chamber within which said rotor operates, an air passage formed in said closure, an air chamber defined by the outer wall of the cylinder and the casing, said chamber receiving air through said passage, inlet ports cut through the cylinder and leading into the interior of said cylinder, an exhaust chamber defined by the casing and cylinder, outlet ports in said cylinder wall angularly spaced from said inlet ports and leading into said discharge chamber, discharge ports in the end of the casing leading from said discharge chamber, and means in said discharge chamber for distributing air to said discharge ports.

14. In a fluid-operated motor, a casing having a restricted end opening defined by a partition, a cylinder within the casing, an inlet chamber defined by the casing and cylinder extending a portion of the length of the cylinder, inlet ports from said inlet chamber leading into the interior of the chamber, an exhaust chamber defined by the casing and cylinder extending around the cylinder at one end thereof and also extending lengthwise of said cylinder, outlet ports through said cylinder leading from the interior thereof into the lengthwise portion of said exhaust chamber, and discharge ports through said partition leading from the circumferential portion of said exhaust chamber.

15. In a fluid-operated motor, a casing having a restricted end opening defined by a partition, a cylinder within the casing, an inlet chamber defined by the casing and cylinder extending a portion of the length of the cylinder, inlet ports from said inlet chamber leading into the interior of the chamber, an exhaust chamber defined by the casing and cylinder extending around the cylinder at one end thereof and also extending lengthwise of said cylinder, outlet ports through said cylinder leading from the interior thereof into the lengthwise portion of said exhaust chamber, discharge ports through said partition leading from the circumferential portion of said exhaust chamber, and baffles in said portion of said exhaust chamber for distributing air therefrom to said discharge ports.

16. In a fluid-operated motor, a casing, a cylinder within the casing, a partition at one end of the casing against which the cylinder abuts, a closure within the casing for the other end of the cylinder, a passage extending lengthwise through said closure, an arcuate channel in the face of the closure leading to the passage, an inlet chamber defined by the casing and cylinder to which said passage leads, inlet ports from said chamber into the interior of the cylinder, an exhaust chamber defined by the cylinder and casing, said chamber having a portion extending lengthwise of the cylinder and another portion extending circumferentially of the cylinder, outlet ports leading from the interior of the cylinder into said exhaust chamber, discharge ports leading from said exhaust chamber through said partition, and means for supplying air to said passage.

17. A fluid-operated motor which comprises a casing having a restricted opening at one end defined by an end partition, a cylinder within the casing abutting the partition, a partition within the cylinder dividing it into a large chamber and a small chamber, a closure within the casing for the end of the cylinder remote from said end partition, said closure having a cap which with the closure defines a small chamber, a shaft having one end in said closure chamber, said shaft extending through the cylinder and through the restricted opening of the cylinder, a rotor on said shaft within the large chamber carrying vanes engaging the inner wall of the cylinder, a bearing for the shaft in each of said small chambers, a closure plate in the end of the cylinder adjacent said partition for enclosing one of said bearings, said plate carrying a bearing for the shaft, means for supplying lubricant to said small chambers for the bearings therein, and a lubricant retainer at the end of the casing adjacent said partition for preventing escape of lubricant along said shaft.

18. In a fluid operated motor, a casing, a cylinder fitting closely within the casing, said cylinder having an inlet chamber formed in its outer surface and extending longitudinally thereof, said chamber being in part defined by said casing, an outlet chamber also formed in the outer wall of said cylinder and having a portion extending longitudinally of said cylinder and another portion extending circumferentially, said outlet chamber being in part defined by said casing, ports in the cylinder wall leading from the inlet chamber into the interior of the cylinder, ports through the cylinder wall leading from the interior of the cylinder to the lengthwise portion of the exhaust chamber, means for supplying air to the inlet chamber, a rotor within the cylinder, and vanes carried by the rotor and contacting with the inner wall thereof.

JAMES HENRY YOUNG.